United States Patent

Wakeling

[15] 3,678,413

[45] July 18, 1972

[54] PULSE CODE MODULATION FEEDBACK ENCODERS

[72] Inventor: Peter John Wakeling, Essex, England

[73] Assignee: The Marconi Company Limited, London, England

[22] Filed: Dec. 3, 1970

[21] Appl. No.: 94,816

[30] Foreign Application Priority Data

Jan. 3, 1970 Great Britain ...........................344/70

[52] U.S. Cl. ............................332/9 R, 307/236, 325/38 R, 325/40, 328/57, 332/11 R

[51] Int. Cl. ....................................................H03k 7/00

[58] Field of Search..........................332/9, 9T, 11, 11 D; 328/140, 57; 307/236; 325/38, 38 A, 38 B, 39, 40; 340/348

[56] References Cited

UNITED STATES PATENTS

| | | | |
|---|---|---|---|
| 3,175,212 | 3/1965 | Miller | 332/11 X |
| 3,452,297 | 6/1969 | Kelly et al. | 332/9 |
| 2,876,418 | 3/1959 | Villars | 332/11 X |
| 3,073,904 | 1/1963 | Davis | 332/11 X |

*Primary Examiner*—Alfred L. Brody
*Attorney*—Baldwin, Wight & Brown

[57] ABSTRACT

A pulse code modulation encoder having two comparators, one receiving analogue signals to be encoded via a unity gain amplifier and the other arranged to receive signals after they have been amplified by a fixed amount. If the analogue signal is above a predetermined value it is fed to the one comparator and if below the predetermined value it is fed to the other comparator. The predetermined value is the voltage represented by the first amplitude digit of the P.C.M. code and dependent upon whether the analogue signal is above or below the predetermined value then AND gates in the comparator outputs are either inhibited or enabled.

6 Claims, 3 Drawing Figures

INVENTOR
Peter John Wakeling
BY
Baldwin Wight & Brown
ATTORNEYS

PATENTED JUL 18 1972 3,678,413

SHEET 2 OF 3

INVENTOR
Peter John Wakeling
BY
Baldwin Wight & Brown
ATTORNEYS

INVENTOR
Peter John Wakeling
BY
Baldwin Wight & Brown
ATTORNEYS

PULSE CODE MODULATION FEEDBACK ENCODERS

The present invention relates to pulse code modulation (P.C.M.) feedback encoders.

With feedback P.C.M. encoders digitally coded signals are produced by comparing in a comparator circuit the analogue signal to be translated with the voltage from a variable voltage source. The voltage source is variable over a range of fixed values and is varied in steps at each comparison to produce an output signal which, when fed to the comparator, is substantially equal to the instantaneous value of the analogue signal. The P.C.M. coded signal is accordingly a signal representative of the particular voltage value required to be provided by the variable voltage source in order to equal the analogue signal. In commonly employed encoders, the voltage source used has a stepped output and is operated by a digital logic control circuit, it being possible, for example, to produce 64 different voltage steps if using a six digit binary control signal. It is also common to use a voltage source in which the voltage steps are not equal over the whole range but in which small steps are used at low voltage levels and large steps at the higher voltage levels. One such voltage source is described in U. S. Pat. No. 3,530,386 corresponding to British Pat. specification No. 1,130,076 Oct. 9, 1968.

Figure 1:
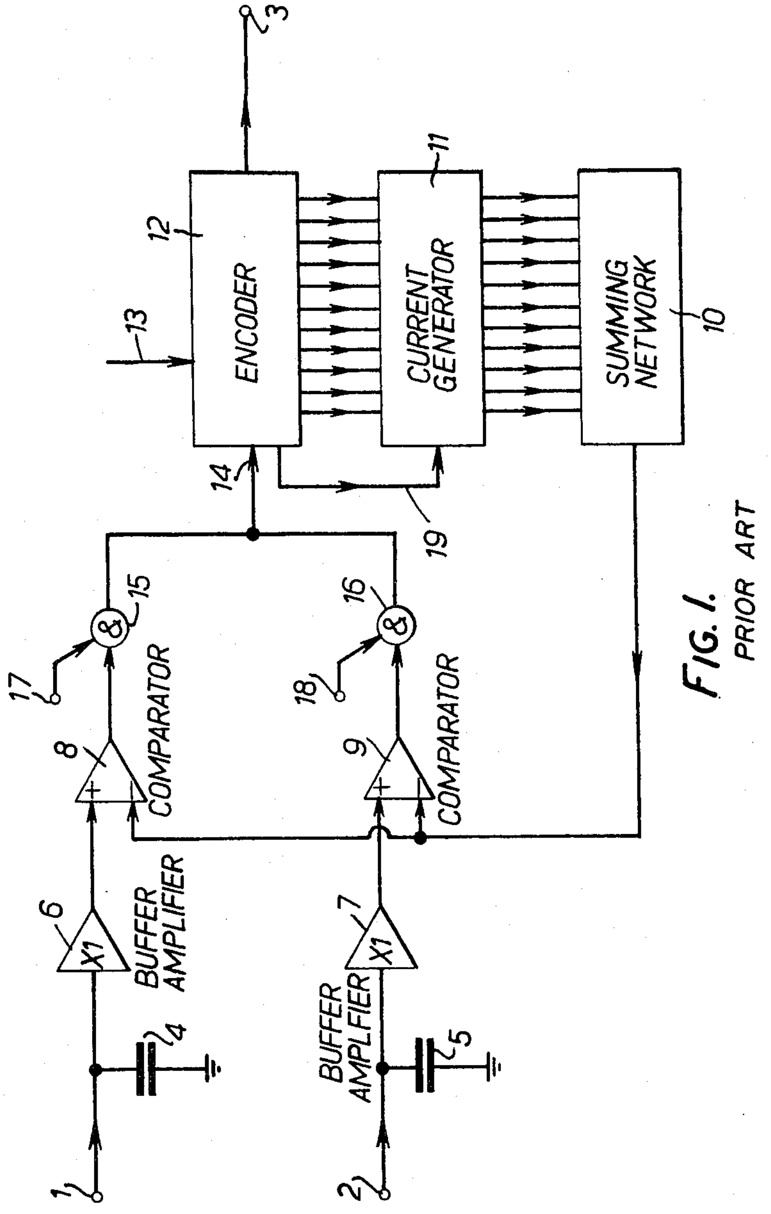
FIG. 1. PRIOR ART
FIG. 1 is a diagram illustrating an encoder according to the prior art.

An example of a feedback encoder as at present employed is shown in block diagrammatic form in FIG. 1 of the accompanying drawings. As shown, the arrangement is required to provide P.C.M. coded signals representative of the analogue signals appearing on two incoming highways 1 and 2, the P.C.M. signals appearing at an output terminal 3. The analogue signals are stored during encoding in respective storage capacitors 4 and 5, the charges of which are passed, via buffer amplifiers 6 and 7 respectively, each to one input of a respective comparator 8 and 9. The other input of each comparator is a feedback voltage from a summing network 10. This summing network 10 provides an output voltage corresponding to the sum of a plurality of currents provided by a current generator 11, the current generator and summing network together forming a variable voltage source as described in the previous paragraph. The current generator 11 is controlled by an encoder logic circuit 12 which has a signal input 14 from the comparators 8 and 9 and a timing signal input 13. The signals from each of the comparators 8 and 9 pass through respective AND gates 15 and 16. These AND gates 15 and 16 have additional enabling inputs 17, 18 respectively.

In operation analogue signals are sampled on the highways and the sample voltages are stored by the capacitors 4 and 5, these voltages being passed by the buffer amplifiers 6 and 7, which are of unity gain, to the comparators 8 and 9. Only one signal is coded at a time, so that the analogue signals appearing on the highways are coded alternately. For this purpose pulses are applied alternately to the enabling inputs 17, 18 of the AND gates 15, 16 so that at any one time only one AND gate is enabled and the signals are passed there-through to the encoder 12. Initially a detection is made of the polarity of the incoming analogue sample to determine the first digit (polarity digit) of the P.C.M. coded signal and the encoder logic circuit 12 instructs the current generator 11, via a lead 19, of the polarity of the current which it is required to produce for use during the subsequent amplitude comparisons. The encoder then instructs the current generator to produce a current which, when fed to the summing network, will result in an output therefrom of a voltage equal to the value of voltage represented by the first amplitude digit (second P.C.M. code digit) of the P.C.M. code. This voltage is compared with the analogue voltage in the associated comparator and if the analogue voltage is higher than the feedback voltage provided by the summing network 10, then a "1" is fed to the encoder logic 12, and therefrom to the output 3, and the encoder instructs the current generator and summing network to produce an output voltage corresponding to the value represented by the second amplitude digit. This is added to the originally produced voltage and the combined voltage compared with the sampled analogue voltage. If this combined voltage is then higher than that presented at the analoguing input a "0" signal is produced at the P.C.M. output and the encoder cancels the current producing the voltage corresponding to the second amplitude digit and instructs the current generator to produce a current which will provide a voltage corresponding to the third amplitude digit. Once again, a comparison is effected and a "1" or a "0" is produced. The process is repeated until a P.C.M. coded signal is obtained representative of the amplitude level of the analogue input.

The use of two amplitude modulated highways to feed one encoder allows a full channel period for discharging a highway capacitor and its subsequent recharging to the next sample level before encoding starts. The maximum speed of encoding is then limited by the speed of operation of the current switches and the speed of comparison by the comparators. The comparator response time, however, increases as the voltage step size decreases. It is common to employ a non-linear voltage generating arrangement (i.e., for example, current generator 11 and summing network 10) so that the comparator response time varies in dependence upon the amplitude of the incoming analogue signal. Therefore the comparator response time which must be allowed for each encoding step is dictated by the length of time taken to code an analogue signal at a low amplitude level where the step size is smallest, this time being appreciably longer than that required for a signal at a high amplitude level.

The invention seeks to provide an improved feedback encoding arrangement in which the speed of comparison may be improved as compared with that of known arrangements such as that shown in FIG. 1.

According to this invention a pulse code modulation feedback encoder comprises two comparators, one arranged to receive the analogue signals to be encoded without their having been increased in amplitude and the other arranged to receive signals after these have been amplified by a predetermined fixed amount; and means for determining whether or not the analogue signals to be coded are above or below a predetermined level and for causing the output of said one comparator to be used in the encoding operation if the signals are above said predetermined level and for causing the output of said other comparator to be used in the encoding operation if the signals are below said predetermined level.

In the preferred embodiment of the invention the output from each comparator is fed through a respective one of two AND gates the output signals being passed to a logic circuit included in the feedback encoder via one or other of the two gates in dependence upon enabling signals fed to the gates from said logic circuit.

Preferably the logic circuit is arranged to enable the AND gate in the output from said other comparator at the start of each encoding operation so that said output is used in determining the polarity of the analogue signal.

Preferably the aforesaid predetermined level is the voltage represented by the first amplitude digit of the P.C.M. code and said logic circuit enables the AND gate in the output from said one comparator immediately after the polarity detection and inhibits the other AND gate, and the comparator is then used to detect whether the analogue input is larger or smaller than said predetermined level and if the former applies the enabled AND gate is left enabled and if the latter applies the enabled AND gate is inhibited and said other AND gate is enabled for the remainder of the encoding operation.

Figure 2:
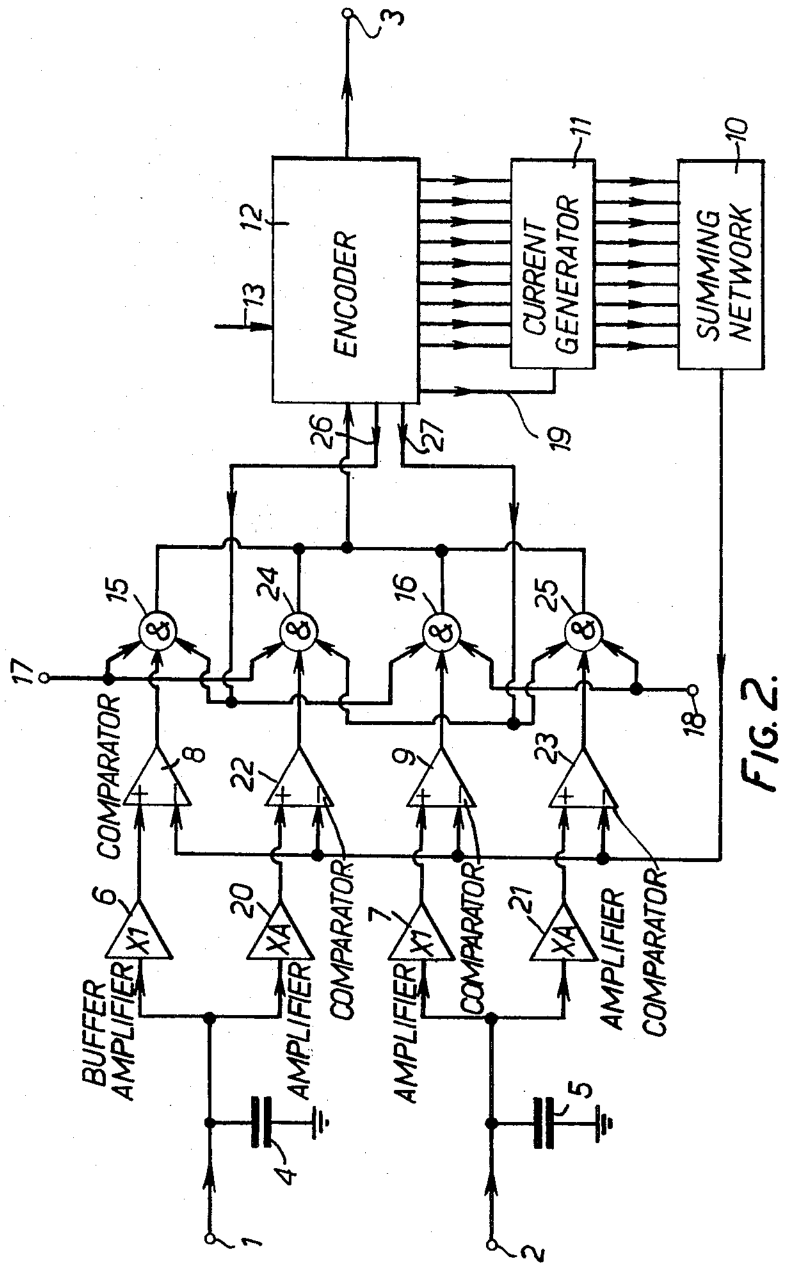
FIG. 2 is a diagram illustrating an encoder according to this invention.
Figure 3:
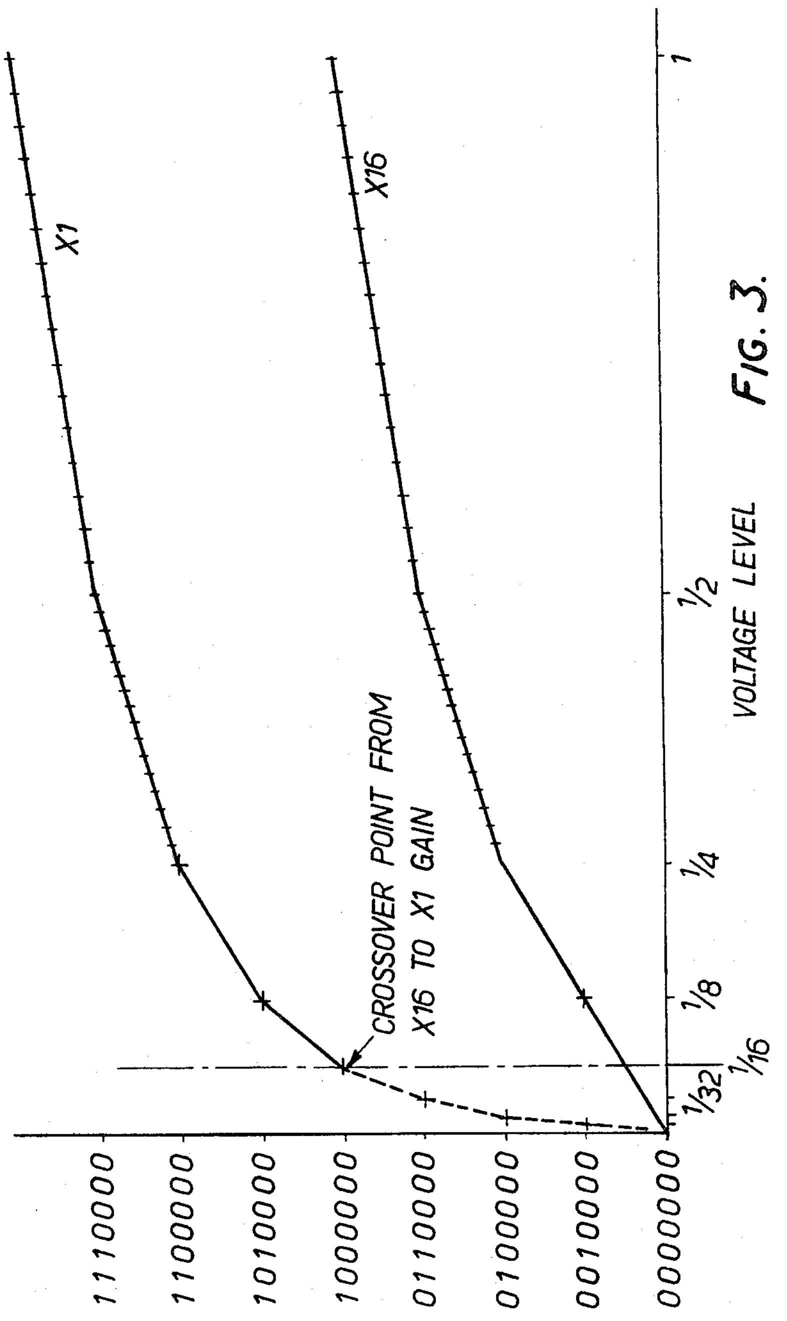
FIG. 3 is a graph illustrating certain aspects of this invention.

The invention is illustrated in and further explained in connection with FIGS. 2 and 3 of the accompanying drawings. FIG. 2 is a diagram of one form of pulse code modulation feed back encoder in accordance with the invention and FIG. 3 is a graphical figure used in explaining the operation of the embodiment of FIG. 2. In FIG. 2 parts corresponding with parts in FIG. 1 have been given like references.

The circuit of FIG. 2 differs from that of FIG. 1 by the addition in each analogue highway of an amplifier with a predetermined fixed gain A. These amplifiers are referenced 20 and 21 for the highways 1 and 2 respectively. There are also additional comparators 22 and 23 and AND gates 24 and 25 for the highways 1 and 2 respectively. These AND gates are three input AND gates and are used in place of the two input AND gates of FIG. 1. The additional or third input to each AND gate is provided by one or other of two additional outputs 26 and 27 of the encoder circuit 12, output 26 being coupled to the AND gates 15 and 16 and output 17 to the AND gates 24 and 25.

FIG. 3 shows two voltage curves, the abscissae representing stepped voltage levels, relative to a maximum voltage of unity, which may be produced by the variable voltage source formed by the current generator 11 and the summing network 10, and the ordinates representing the P.C.M. coded signals corresponding to the voltage levels. The upper half of FIG. 3 is a segmented voltage curve consisting of eight straight line segments with the first two having the same gradient. The start of each of the segments corresponds to a referenced P.C.M. code on the ordinate. Each of the segments is divided into 16 further portions. The voltage steps on a straight line portion are the same but, except for those steps on the first two segments (which are the same) they differ from the steps in other straight line portions. The size of the voltage steps increases by a factor of 2 with each successive straight line portion (except for the first two). There are, therefore, 128 voltage levels with 7 different magnitudes of voltage step, there being 32 voltage steps at the smallest voltage. The arrangement of FIG. 2 is arranged to feed the analogue signals to both of the comparators connected to the same input highway. If the analogue voltage is above the voltage level represented by the code 1000000, i.e., at a voltage level one-sixteenth of the maximum voltage level, then the encoding arrangement utilizes the output of the comparator with the unity gain amplifier in its input. If the analogue voltage level is lower than one-sixteenth of the maximum level then the encoding arrangement utilizes the output of the comparator with the amplifier gain A in its input. In the latter case the voltages produced by the voltage source for use in the comparator are shown in the lower half of FIG. 3. The voltage steps of this lower curve are shown magnified by a gain of 16, this being the value of the amplification A of the amplifiers 20 and 21.

The arrangement of FIG. 2 operates as follows:

When an analogue signal is to be encoded it is stored in the respective hold capacitor 4 or 5 and is then fed via the amplifiers to the comparators. At the start of each encoding operation the respective gate 24 or 25 is enabled so that polarity detection is made using an amplified analogue signal. This ensures that the polarity can be readily detected even if the amplitude of the analogue signal is small. After polarity determination the gate 24 or 25 is inhibited and the corresponding one of the gates 15 and 16 is enabled and the analogue signal is compared with the voltage level represented by the first amplitude digit of the P.C.M. code, i.e., one-sixteenth the maximum voltage. If the appropriate comparator 8 or 9 indicates that the analogue voltage is above this level then the signals from the logic circuit 12 on line 26 are maintained for the rest of that encoding operation. If, on the other hand, it is detected that the signal is lower than this value, the logic circuit cancels the enabling signal on output 26 and feeds instead an enabling signal via the output 27 to the AND gates 24 and 25. The remainder of that encoding operation is then carried out using the output from the respective comparator 22 or 23. In other respects the arrangement of FIG. 2 operates in the same manner as the arrangement of FIG. 1, the results of each comparison producing a "1" or a "0" for the P.C.M. code. With the arrangement of FIG. 2, however, the magnitude of the smallest voltage step required is eight times that requires in the arrangement of FIG. 1, the smallest step now occurring in the segment extending from one-sixteenth to one-eighth of the maximum voltage.

By utilizing two amplifiers and comparators and effecting a selection of one or other digitally the speed of response is made faster than if a single variable amplification amplifier and associated comparator were used since it would take time for the amplifier to stabilize after a change of amplification.

I claim:

1. A pulse code modulation feedback encoder including an encoding logic circuit to which timing signals may be applied; generator means for generating a feedback voltage dependent upon signals in said logic circuit; two comparators, said feedback voltage being applied to one input of each comparator, means for applying an analogue signal to be encoded to the other input of one comparator, amplifying means for amplifying said analogue signal by a predetermined fixed amount and means for applying said amplified analogue signal to the other input of the other comparator; and gating means for passing the output of said one comparator to said logic circuit to be used in the encoding operation if the analogue signal is above a predetermined level and for passing the output of said other comparator to said logic circuit to be used in the encoding operation if the analogue signal is below said predetermined level.

2. An encoder as claimed in claim 1 wherein said gating means includes two AND gates and the output from each comparator is fed through a respective one of said two AND gates to said logic circuit, one or other of the two gates being enabled in dependence upon enabling signals fed to the gates from said logic circuit.

3. An encoder as claimed in claim 2 wherein the logic circuit is arranged to enable the AND gate in the output from said other comparator at the start of each encoding operation so that said output is used in determining the polarity of the analogue signal.

4. An encoder as claimed in claim 3 wherein the aforesaid predetermine level is the voltage represented by the first amplitude digit of the P.C.M. code and said logic circuit enables the AND gate in the output from said one comparator immediately after the polarity detection and inhibits the other AND gate, and the comparator is then used to detect whether the analogue input is above or below said predetermined level and if the former applies the enabled AND gate is left enabled and if the latter applies the enabled AND gate is inhibited and said other AND gate is enabled for the remainder of the encoding operation.

5. A pulse code modulation feedback encoder comprising, in combination:

first and second comparators each having a pair of input terminals and an output terminal;

means for applying a first input signal to one input terminal of said first comparator and a second input signal to one input terminal of said second comparator in which said first and second input signals are different fixed multiples of an analogue signal to be encoded;

means for applying a reference signal to the other input terminals of said first and second comparators;

gate means for passing only the output signal at the output terminal of one of said first and second comparators; and means controlling said gate means for passing the signal from said first comparator when an analogue signal to be encoded exceeds a predetermined value established by said reference signal and for passing the signal from said second comparator when an analogue signal to be encoded is less than said predetermined value.

6. A pulse code modulation feedback encoder as defined in claim 5 wherein the last mentioned means comprises encoder means for producing a digital output corresponding to an analogue signal to be encoded; said means for applying produces reference signals corresponding to said digital output and includes means for producing a reference signal of fixed amplitude at the beginning of a cycle whereby to select the comparator utilized during the ensuing portion of the cycle.

* * * * *